(12) United States Patent
Scanlon (10) Patent No.: US 9,493,336 B2
(45) Date of Patent: Nov. 15, 2016

(54) PORTABLE SADDLE STAND APPARATUS

(71) Applicant: Shane Darnell Scanlon, Woodland Hills, CA (US)

(72) Inventor: Shane Darnell Scanlon, Woodland Hills, CA (US)

(*) Notice: Subject to any disclaimer, the term of this patent is extended or adjusted under 35 U.S.C. 154(b) by 0 days.

(21) Appl. No.: 14/963,761

(22) Filed: Dec. 9, 2015

(65) Prior Publication Data

US 2016/0167943 A1 Jun. 16, 2016

Related U.S. Application Data

(60) Provisional application No. 62/090,507, filed on Dec. 11, 2014.

(51) Int. Cl.
| | | |
|---|---|---|
| *A47F 7/00* | (2006.01) | |
| *B68C 1/00* | (2006.01) | |
| *F16B 2/08* | (2006.01) | |
| *F16M 13/02* | (2006.01) | |

(52) U.S. Cl.
CPC ............. *B68C 1/002* (2013.01); *F16B 2/08* (2013.01); *F16M 13/022* (2013.01)

(58) Field of Classification Search
CPC ............ B68C 1/002; B68C 1/00; B68B 9/00
USPC ............ 248/214, 218.4, 219.1, 219.2, 219.3, 248/219.4, 220.21, 220.22; 211/85.11; 54/84
See application file for complete search history.

(56) References Cited

U.S. PATENT DOCUMENTS

| | | | | |
|---|---|---|---|---|
| 3,780,971 A | * | 12/1973 | De Filipps | B68C 1/002 211/104 |
| 4,768,656 A | * | 9/1988 | Hartley | B68C 1/002 211/184 |
| 5,058,841 A | * | 10/1991 | Fernbaugh | B68C 1/002 211/87.01 |
| 5,555,710 A | * | 9/1996 | Smith | B68C 1/12 54/44.6 |
| 6,206,207 B1 | * | 3/2001 | Kelley | B68C 1/002 211/85.11 |
| 2002/0130097 A1 | * | 9/2002 | Steen | B68C 1/002 211/85.11 |
| 2007/0158285 A1 | * | 7/2007 | Mann | A47F 7/00 211/85.11 |
| 2009/0194495 A1 | * | 8/2009 | Kellogg | B68C 1/002 211/85.11 |
| 2014/0338292 A1 | * | 11/2014 | Abel | B68C 1/002 54/44.1 |

* cited by examiner

*Primary Examiner* — Steven Marsh (57) ABSTRACT

A portable saddle stand apparatus that can be secured to an existing structure allows a saddle to be securely placed upon the saddle stand apparatus when the respective saddle is not fastened to an animals back by a girth. The saddle stand apparatus includes a saddle supporting structure, a front mount, a rear mount, a front strap fastener, and a rear strap fastener. The front mount attaches with a front mount receiving bracket of the saddle supporting structure, and the rear mount attaches with a rear mount receiving bracket of the saddle supporting structure. The front strap fastener secures the front mount to the saddle supporting structure while securing a front end of the saddle stand apparatus to the existing structure. Similarly, the rear strap fastener secures the rear mount to the saddle supporting structure while securing a rear end of the saddle stand apparatus to the existing structure.

17 Claims, 9 Drawing Sheets

FIG. 10 ial Patent application Ser. No. 62/090,507 filed on Dec. 11, 2014.

PORTABLE SADDLE STAND APPARATUS

The current application claims a priority to the U.S. Provisional Patent application Ser. No. 62/090,507 filed on Dec. 11, 2014.

FIELD OF THE INVENTION

The present invention relates generally to horse saddle stands. More specifically, the present invention is a portable saddle stand apparatus that can attach to any and all tack rails, fencing, stall doors, and horizontal surfaces.

BACKGROUND OF THE INVENTION

A saddle rack or saddle stand is essential to taking care of a saddle when the respective saddle is not fastened to an animals back by a girth. As a result, the saddle can be kept off the ground. Even though saddle stands or saddle racks are designed to support the saddle in the most perfect way, the majority of saddle stands are decorated with hand forged iron accessories, copper panel, or hand carved designs to enhance the aesthetic appearance. Existing saddle stands are designed to resemble a horse's backbone so that most saddles can be placed on the saddle stands, allowing a secure platform for the saddles. Additionally, the saddles stands also function as a platform for the riders if they prefer to get on the saddle. However, most saddle stands tend to be cumbersome, heavy, and stationary in order to function as the described secured platform. Existing portable and folding saddle stands are only able to withstand the weight of the saddle and not the rider. As a result, these saddles are unable to meet some of the basic industry standard.

It is therefore an object of the present invention to provide a rack type saddle stand apparatus so that the present invention can be securely attached to any and all tack rails, fencings, stall doors or horizontal surfaces that the user may be working or tacking their horse up close to. The present invention is much smaller than a standard saddle stand and solves a major problem in the equestrian industry of expensive saddles falling of tack rails on to the ground. Because the present invention is so sturdy, it can even be used to help saddle retailers fit saddles to their clients by allowing them to mount the saddle on the present invention and sit on the saddle to see if the saddle size is adequate. The present invention can also be used as a saddle training tool in the same way.

DETAIL DESCRIPTIONS OF THE INVENTION

All illustrations of the drawings are for the purpose of describing selected versions of the present invention and are not intended to limit the scope of the present invention.

The present invention is a portable saddle stand apparatus that is smaller in size compared to a standard saddle stand. The present invention allows a user to securely attach it to any and all tack rails, fencing, stall doors, or horizontal surface that the user may be working on or tacking user's horse up close to. The present invention is in essence a type of saddle stand but without the stand itself as the present invention firmly attached to one of the aforementioned structures.

Figure 1:
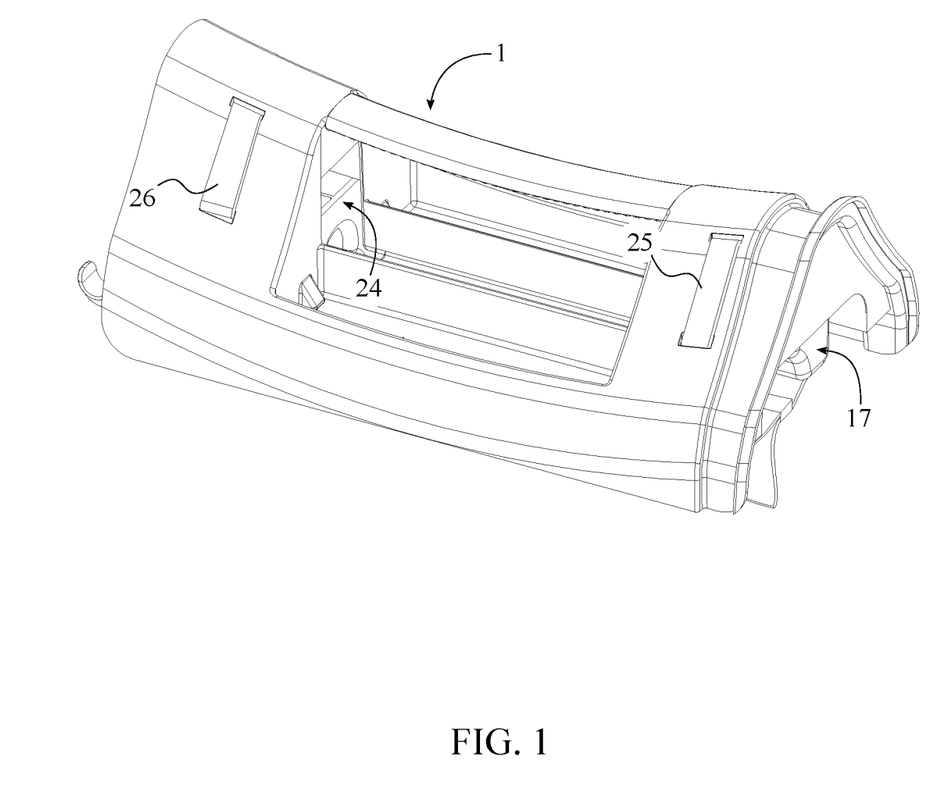
FIG. 1 is a perspective view of the present invention.

The present invention comprises a saddle supporting structure 1, a front mount 17, a rear mount 24, a front strap fastener 25, and a rear strap fastener 26. Furthermore, the saddle supporting structure 1 comprises a shell 2, a front mount receiving bracket 7, a rear mount receiving bracket 8, a plurality of front strap holes 9, and a plurality of rear strap holes 10. In reference to FIG. 1-3, the front mount receiving bracket 7 is positioned adjacent to a front edge 3 of the shell 2 while the rear mount receiving bracket 8 is positioned adjacent to a rear edge 4 of the shell 2. The shell 2 is formed to match the contours of the saddle and provides sufficient surface area for the saddle to rest on. The front mount 17 is attached within the front mount receiving bracket 7, and the rear mount 24 is attached within the rear mount receiving bracket 8. As a result, the front mount 17 and the rear mount 24 are able to provide a stable platform for the shell 2 when the present invention is secured to an existing structure. The front strap fastener 25 is tethered around the saddle supporting structure 1 and the front mount 17 through the plurality of front strap holes 9 in order to secure the present invention from the front end. Similarly, the rear strap fastener 26 is tethered around the saddle supporting structure 1 and the rear mount 24 through the plurality of rear strap holes 10 to secure the present invention from the rear end.

Figure 2:
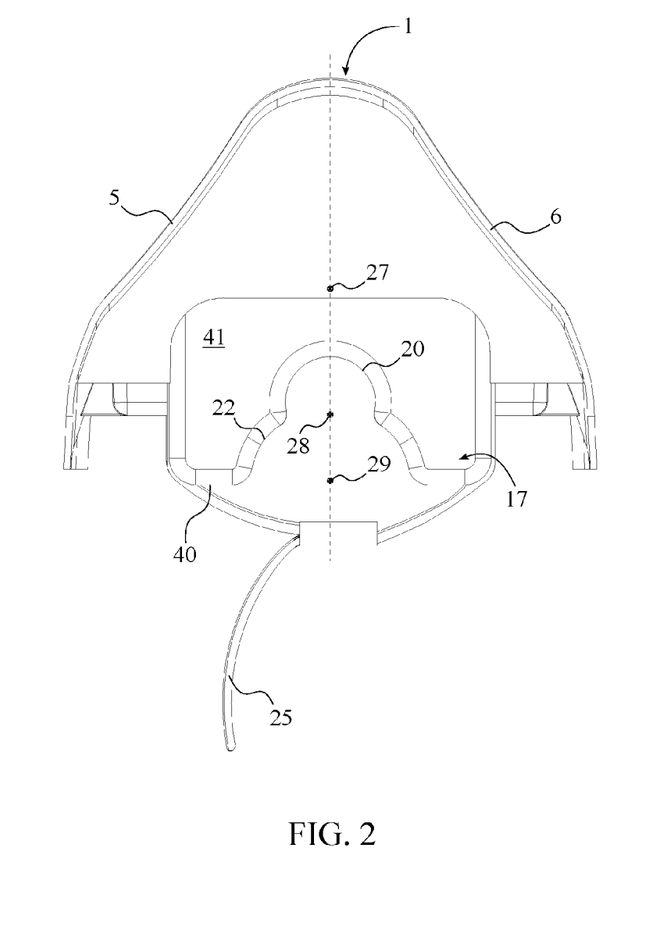
FIG. 2 is a front view of the present invention.
Figure 3:
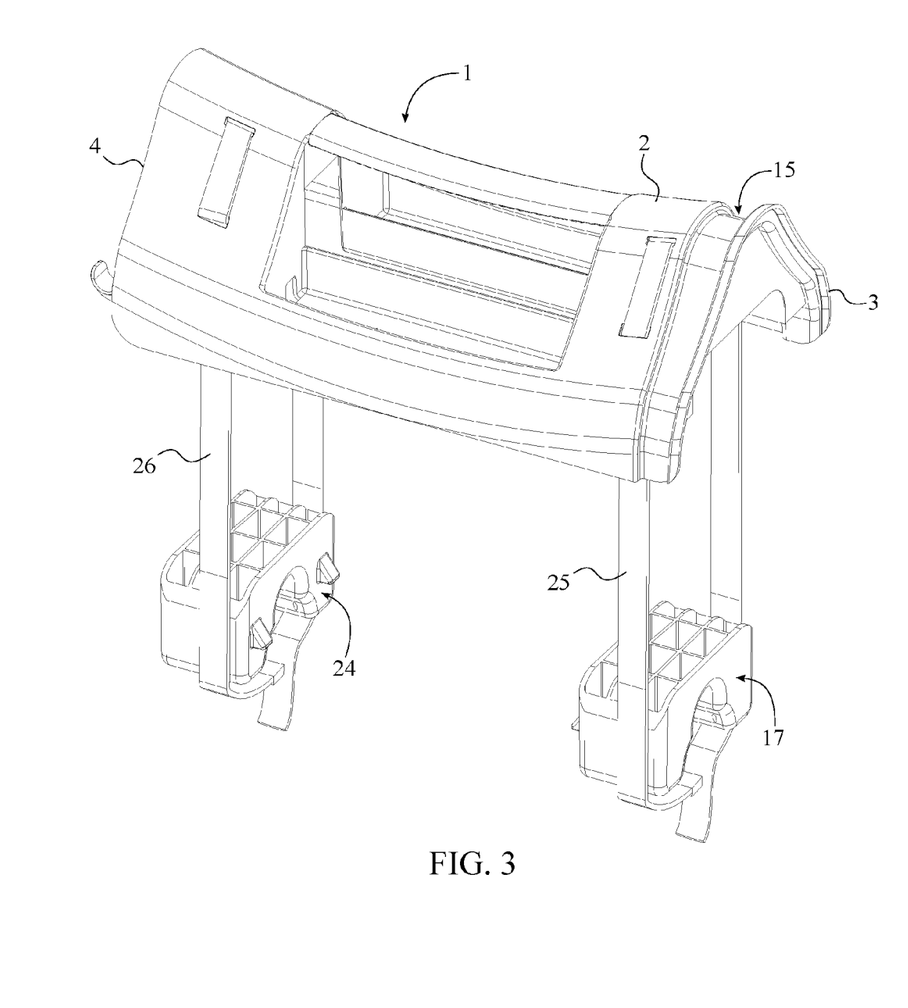
FIG. 3 is an exploded view of the present invention.
Figure 7:
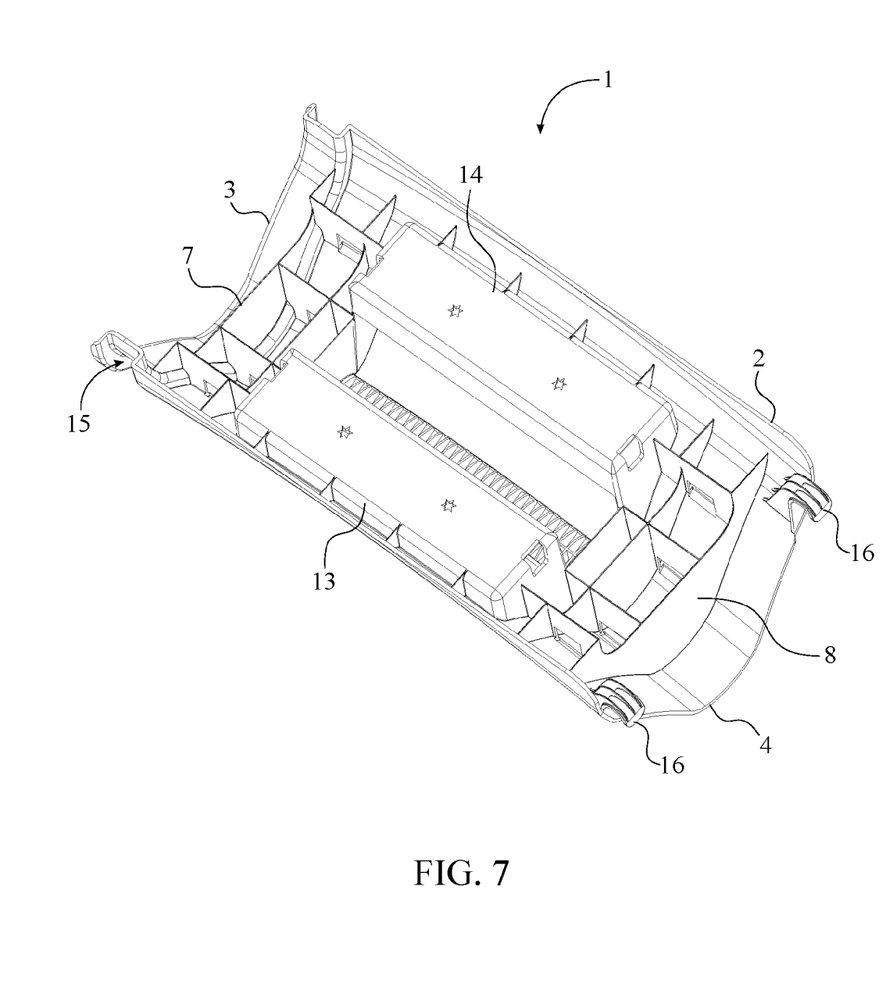
FIG. 7 is a bottom perspective view of the saddle supporting structure of the present invention.

The shell 2, which allows a saddle to be placed and matches with existing contours of a saddle, further comprises a left elongated section 5 and a right elongated section 6 as shown in FIG. 2. The left elongated section 5 and the right elongated section 6 are angularly positioned opposite of each other from the front edge 3 to the rear edge 4. More specifically, the left elongated section 5 and the right elongated section 6 form the general shape of the shell 2 representing a horse's back and girth so that a saddle can be accurately placed upon the present invention. The shape and contours of the shell 2 are delineated by the front edge 3, the rear edge 4, the left elongated section 5, and the right elongated section 6 to accommodate efficient placement for other components of the present invention. Additionally, the left elongated section 5 and the right elongated section 6 delineate an outer surface and an inner surface of the shell 2 from the front edge 3 to the rear edge 4. In reference to FIG. 7, the front mount receiving bracket 7 and the rear mount receiving bracket 8 are integrated onto the inner surface of the shell 2 resulting the saddle to be placed on the outer surface of the shell 2. As a result, the front mount receiving bracket 7 and the rear mount receiving bracket 8 can efficiently receive the front mount 17 and the rear mount 24 without interfering with the placement of the saddle.

Figure 10:
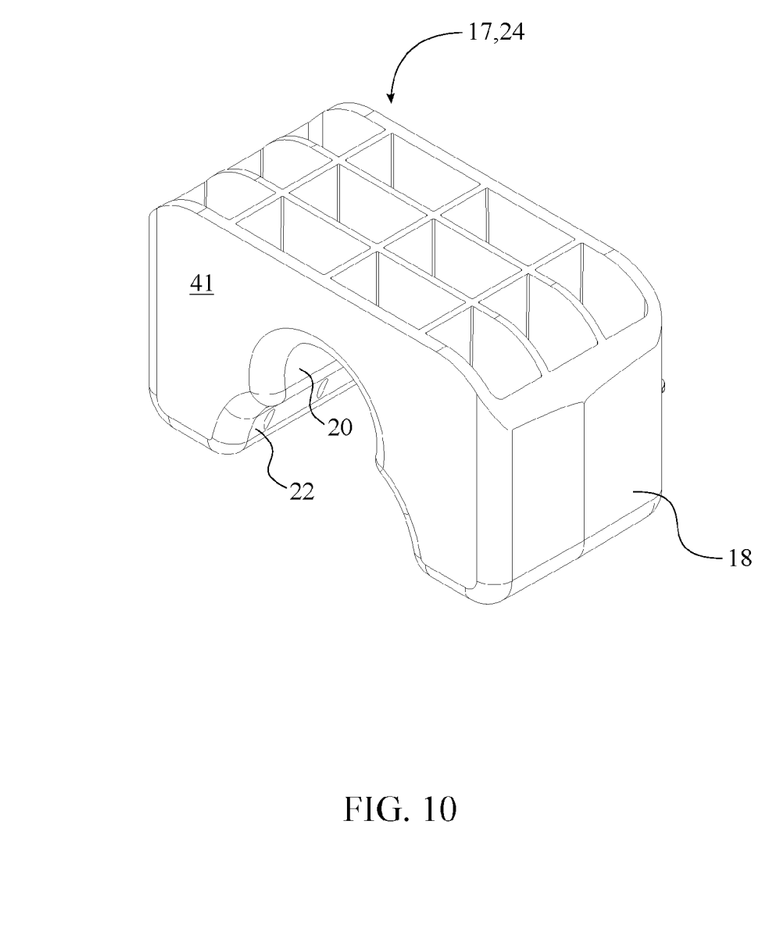
FIG. 10 is a perspective view of the front mount and the rear mount of the present invention.
Figure 11:
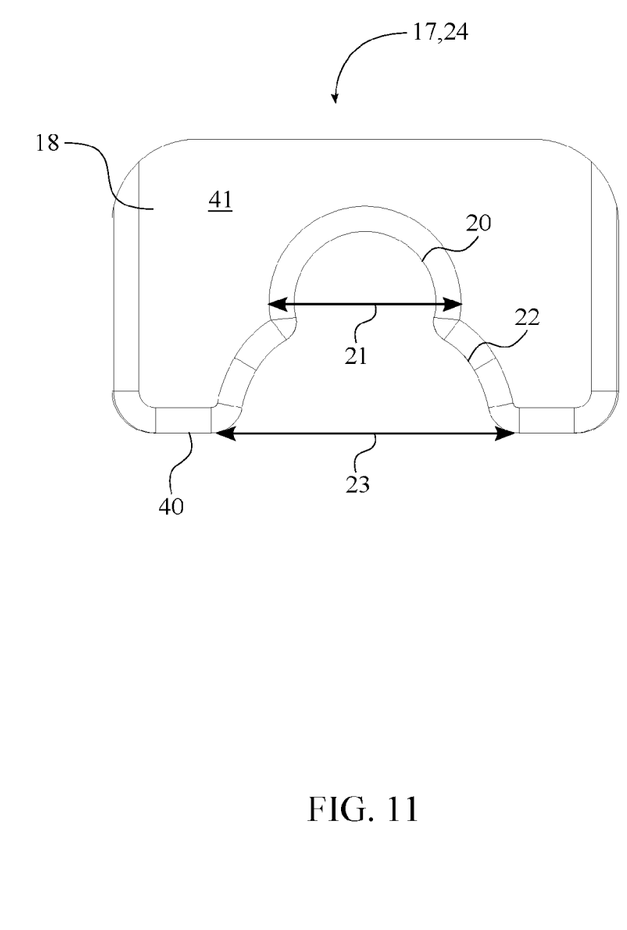
FIG. 11 is a front view of the front mount and the rear mount of the present invention.

The front mount 17 and the rear mount 24 provide a stable platform and multiple securing positions for the present invention. In reference to FIG. 10-11, the front mount 17 and the rear mount 24 each comprise a body 18, a first circular channel 20, and a second circular channel 22. The body 18 is generally a rectangular shaped member so that a bottom surface 40 of the body 18 can be securely placed against a flat existing structure. The body 18 is made of durable material that can withstand weight of the saddle supporting structure 1 and weather elements such as rain, humidity, and elevated temperature. The first circular channel 20 is concentrically positioned with the body 18 as the first circular channel 20 is traversed through the body 18 from a lateral surface 41 of the body 18. The second circular channel 22 is centrally positioned with the bottom surface 40 of the body 18 and traverses into body 18 from the bottom surface 40. As a result, the second circular channel 22 intercepts the first circular channel 20 forming a securing opening for the front mount 17 and the rear mount 24. A diameter 23 of the second circular channel 22 is greater than a diameter 21 of the first circular channel 20 so that the first circular channel 20 and the second circular channel 22 are able to create multiple securing points for the present invention. More specifically, the first circular channel 20 secures the present invention with smaller sized panel railings while the second circular channel 22 secures the present invention with larger sized panel railings. Additionally, the bottom surface 40 of the body 18 secures the present invention with any type railing that are larger than the first circular channel 20 and the second circular channel 22. In reference to FIG. 2, a central axis 27 of the saddle supporting structure 1, a central axis 28 of the first circular channel 20, and a central axis 29 of the second circular channel 22 are vertically aligned parallel to each other in order to symmetrically balance the present invention with the existing structure.

Figure 6:
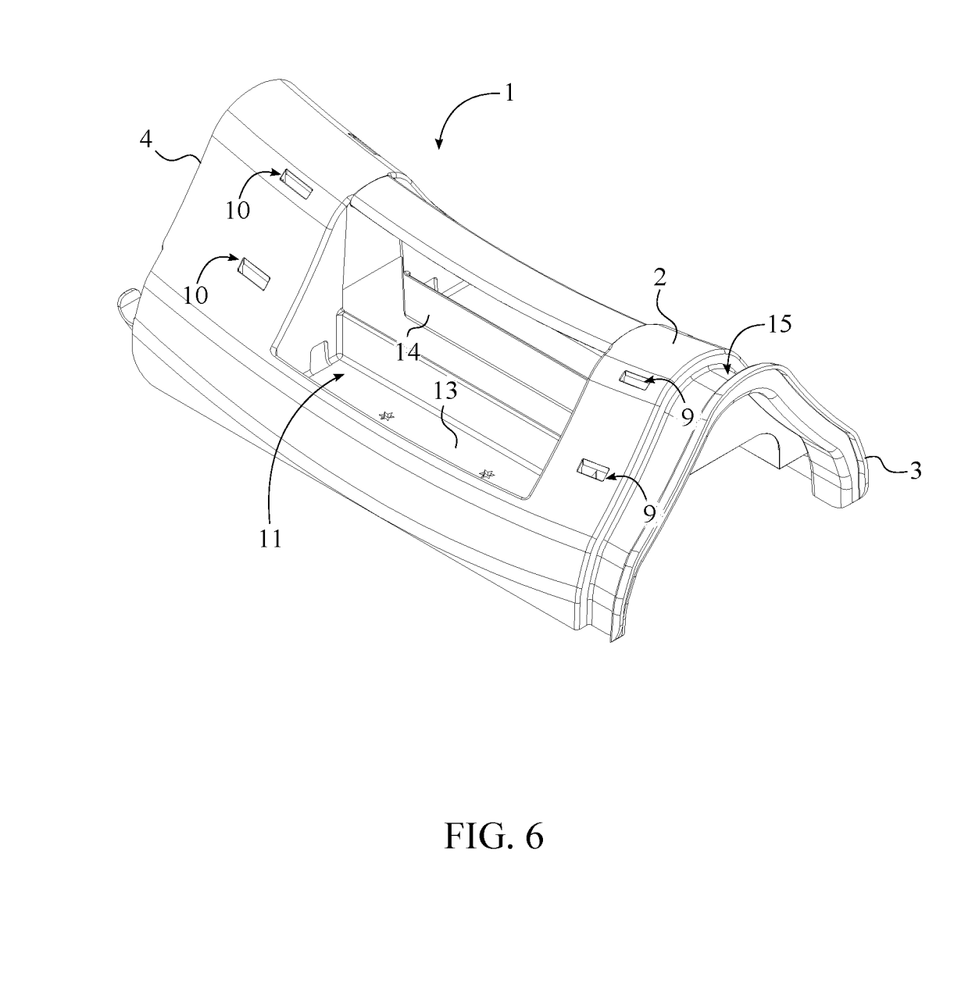
FIG. 6 is a top perspective view of the saddle supporting structure of the present invention.
Figure 8:
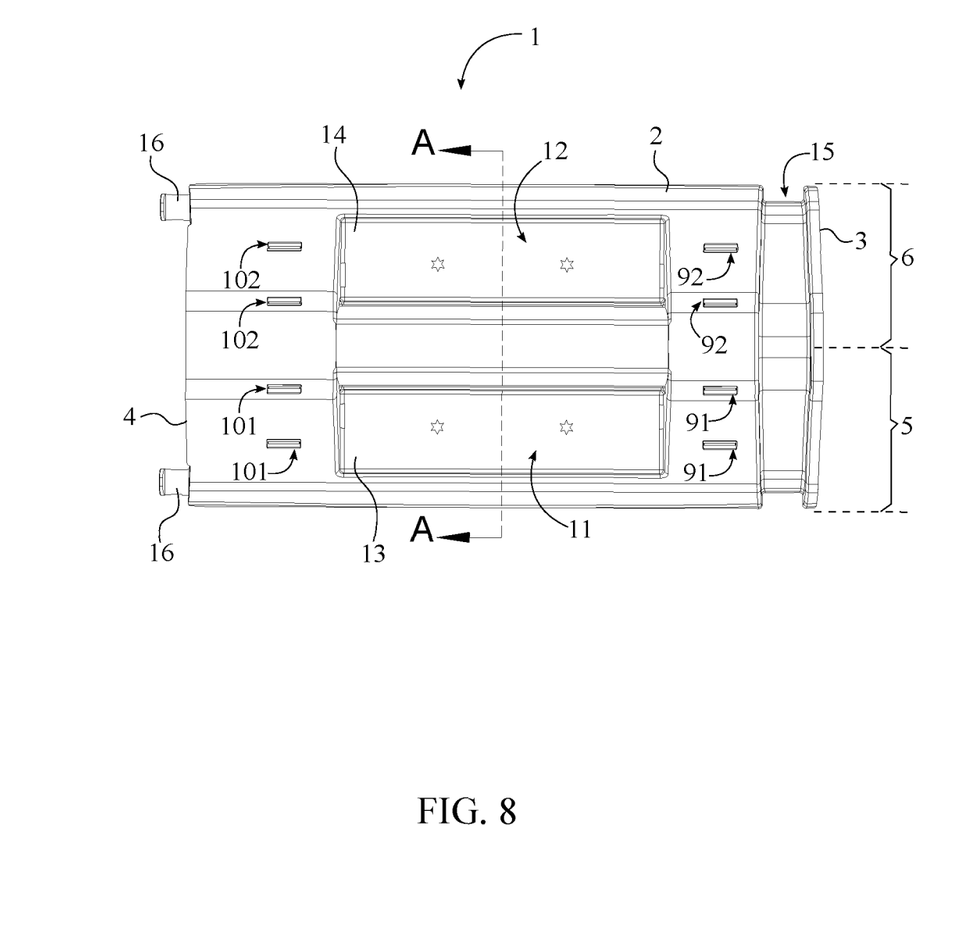
FIG. 8 is a top view of the saddle supporting structure of the present invention, showing the plane upon which cross sectional view is taken shown in FIG. 9.
Figure 9:
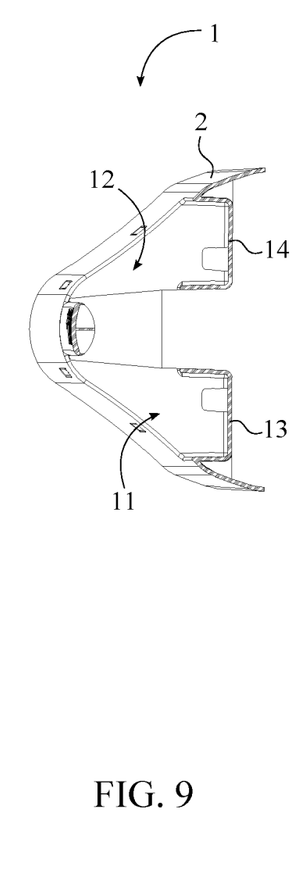
FIG. 9 is a cross section view of the saddle supporting structure of the present invention taken along line A-A of FIG. 8.

The plurality of front strap holes 9 traverses through the shell 2 so that the front strap fastener 25 can be utilized to secure the front end of the present invention to the existing structure. In reference to FIG. 6 and FIG. 8, the plurality of front strap holes 9 comprises a pair of front left holes 91 and a pair of front right holes 92. More specifically, the pair of front left holes 91 traverses through the left elongated section 5 while the pair of front right holes 92 traverses through the right elongated section 6. Additionally, the pair of front left holes 91 and the pair of front right holes 92 are symmetrically positioned of each other with respect to the shell 2 so that the front strap fastener 25 can be tethered within the pair of front left holes 91 to secure the left elongated section 5 and within the pair of front right holes 92 to secure the right elongated section 6. Then the front strap fastener 25 is able to achieve mechanical equilibrium when the front end of the present invention is secured to the existing structure.

The plurality of rear strap holes 10 traverses through the shell 2 so that the rear strap fastener 26 can be utilized to secure the rear end of the present invention to the existing structure. In reference to FIG. 6 and FIG. 8, the plurality of rear strap holes 10 comprises a pair of rear left holes 101 and a pair of rear right holes 102. More specifically, the pair of rear left holes 101 traverses through the left elongated section 5 while the pair of rear right holes 102 traverses through the right elongated section 6. Additionally, the pair of rear left holes 101 and the pair of rear right holes 102 are symmetrically positioned of each other with respect to the shell 2 so that the rear strap fastener 26 can be tethered within the pair of rear left holes 101 to secure the left elongated section 5 and within the pair of rear right holes 102 to secure the right elongated section 6. Then the rear strap fastener 26 is able to achieve mechanical equilibrium when the rear end of the present invention is secured to the existing structure.

Even though the preferred embodiment of the present invention utilizes the front strap fastener 25 and the rear strap fastener 26 to secure the saddle supporting structure 1 through the front mount 17 and the rear mount 24, alternative embodiments of the present invention can use different types of fastening mechanisms to secure the saddle supporting structure 1 through the front mount 17 and the rear mount 24 to the existing structure. The different types of fastening mechanism can include, but is not limited to, a plurality of self-tapping screws, a front and rear latching system, male and female bracket systems, and nut and bolt fastener systems.

Figure 4:
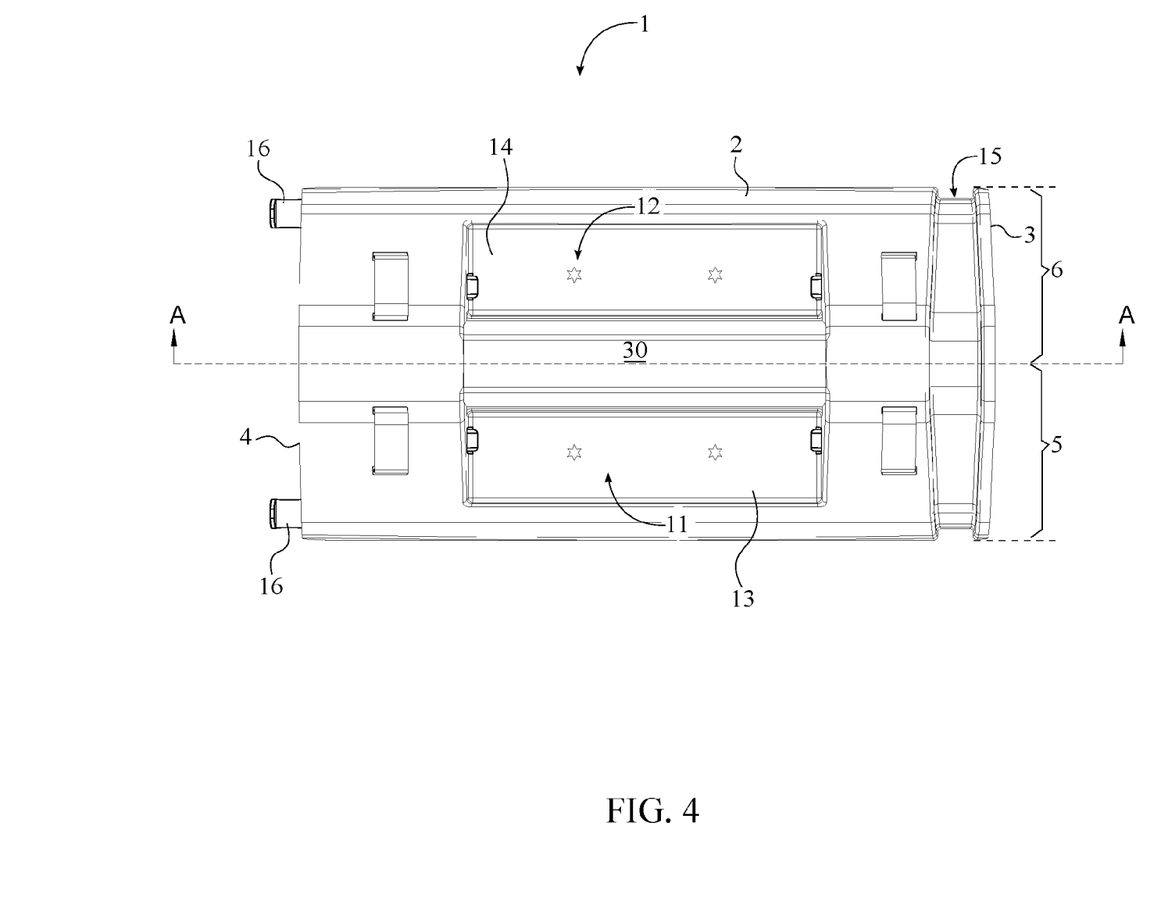
FIG. 4 is a top view of the present invention, showing the plane upon which a cross sectional view is taken shown in FIG. 5.

In reference to FIG. 4, the saddle supporting structure 1 further comprises a pair of accessory hooks 16 to hold horse tack, straps to hold the saddle, saddle bags, and other necessary items that the user may require. The pair of accessory hooks 16 is connected onto the rear edge 4 so that the pair of accessory hooks 16 may not interfere with the positioning of the saddle placement.

In reference to FIG. 4, FIG. 6, FIG. 8, and FIG. 9, the saddle supporting structure 1 further comprises a first opening 11, a first storage compartment 13, a second opening 12, and a second storage compartment 14. The first storage compartment 13 and the second storage compartment 14 provide two separate sections within the present invention so that the user is able to store variety of items such as, water bottle, horse dressing tools, and horse tacks. The first opening 11 and the second opening 12 form two different windows within the shell 2, allowing the user to access the first storage compartment 13 and the second storage compartment 14 respectively. In reference to FIG. 7, the first storage compartment 13 is internally positioned with the left elongated section 5 and integrated onto the front mount receiving bracket 7 and the rear mount receiving bracket 8. The first storage compartment 13 is accessed through the first opening 11 as the first opening 11 traverses through the left elongated section 5 and aligned with the first storage compartment 13. In reference to FIG. 7, the second storage compartment 14 is internally positioned with the right elongated section 6 and integrated onto the front mount receiving bracket 7 and the rear mount receiving bracket 8. The second storage compartment 14 is accessed through the second opening 12 as the second opening 12 is traversed through the right elongated section 6 and aligned with the second storage compartment 14. The length, width, and the depth of the first storage compartment 13 and the second storage compartment 14 are not limited to specific measurements and can differ from one embodiment to another. Due to the positioning of the first opening 11 and the second opening 12, a handle 30 is formed within the shell 2 of the present invention. In reference to FIG. 4, the handle 30 is formed with the left elongated section 5 and the right elongated section 6 as the first opening 11 and the second opening 12 delineate the edges of the handle 30. The handle 30 allows the users to easily grab and carry the present invention from one place to another.

Additionally, the first storage compartment 13, the second storage compartment 14, the front mount 17, and the rear mount 24 each comprise a plurality of drain holes. The plurality of drain holes is evenly and efficiently traversed through each component to drain water and moisture that the present invention may collect from being stored outdoors. More specifically, the plurality of drain holes traverses through a bottom panel of the body 18 to discharge water from the front mount 17 and the rear mount 24. Similarly, the plurality of drain holes is traversed through a base of the first storage compartment 13 and the second storage compartment 14 to discharge water from the first storage compartment 13 and the second storage compartment 14.

Figure 5:
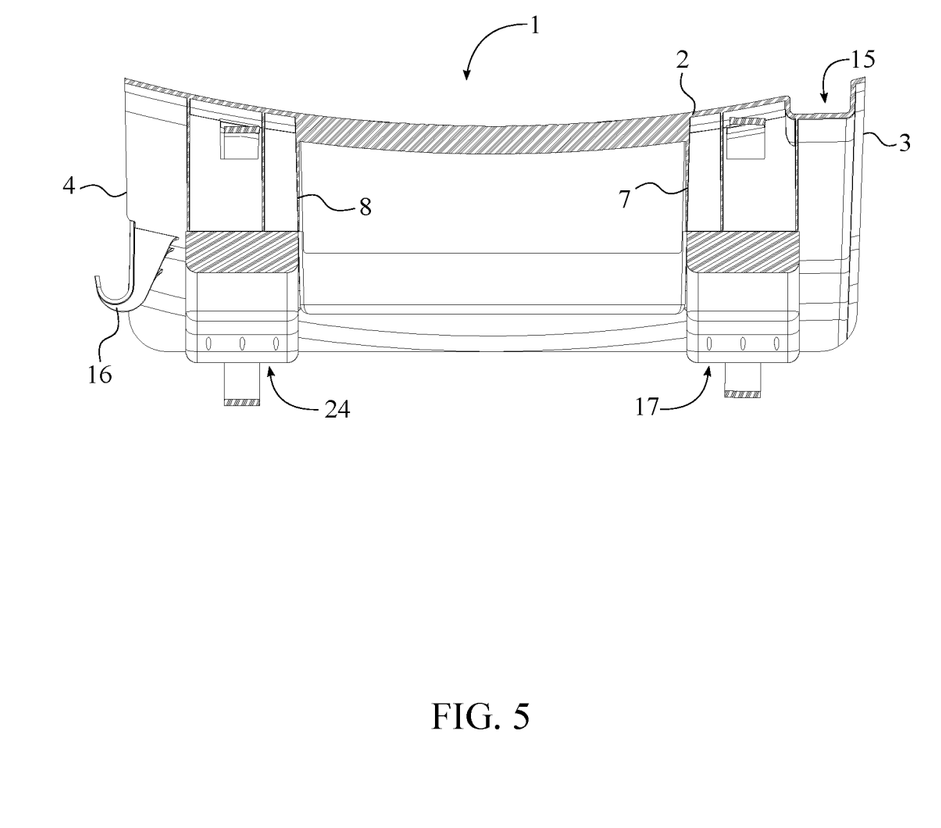
FIG. 5 is a cross section view of the present invention taken along line A-A of FIG. 4.

In reference to FIG. 4-5, the saddle supporting structure 1 further comprises an indentation 15 to place the reins that are typically uses to guide or check a horse while riding. In order to separately position the saddle and the reins, the indentation 15 is adjacently positioned with the front edge 3 and extended from the left elongated section 5 to the right elongated section 6. As a result, the indentation 15 is externally integrated onto the shell 2 in between the front edge 3 and the plurality of front strap holes 9.

Although the invention has been explained in relation to its preferred embodiment, it is to be understood that many other possible modifications and variations can be made without departing from the spirit and scope of the invention as hereinafter claimed.

What is claimed is:

1. A portable saddle stand apparatus comprises:
    a saddle supporting structure;
    a front mount;
    a rear mount;
    a front strap fastener;
    a rear strap fastener;
    the saddle supporting structure comprises a shell, a front mount receiving bracket, a rear mount receiving bracket, a plurality of front strap holes, and a plurality of rear strap holes;
    the front mount receiving bracket being positioned adjacent to a front edge of the shell;
    the rear mount receiving bracket being positioned adjacent to a rear edge of the shell;
    the front mount receiving bracket and rear mount receiving bracket being internally integrated onto the shell;
    the front mount being attached within the front mount receiving bracket;
    the rear mount being attached within the rear mount receiving bracket;
    the front strap fastener being tethered around the saddle supporting structure and the front mount through the plurality of front strap holes; and
    the rear strap fastener being tethered around the saddle supporting structure and the rear mount through the plurality of rear strap holes.

2. The portable saddle stand apparatus as claimed in claim 1 comprises:
    the shell comprises a left elongated section and a right elongated section;
    the left elongated section and the right elongated section being angularly positioned opposite of each other from the front edge to the rear edge; and
    the shell being delineated by the front edge, the rear edge, the left elongated section, and the right elongated section.

3. The portable saddle stand apparatus as claimed in claim 1 comprises:
    the saddle supporting structure further comprises a first opening, a first storage compartment, a second opening, and a second storage compartment;
    the first opening traversing through a left elongated section of the shell;
    the first storage compartment being internally positioned with the left elongated section and aligned with the first opening;
    the first storage compartment being integrated onto the front mount receiving bracket and the rear mount receiving bracket;
    the second opening traversing through a right elongated section of the shell;
    the second storage compartment being internally positioned with the right elongated section and aligned with the second opening;
    the second storage compartment being integrated onto the front mount receiving bracket and the rear mount receiving bracket;
    a handle being positioned within the shell; and
    the handle being delineated from the first opening to the second opening.

4. The portable saddle stand apparatus as claimed in claim 1 comprises:
    the saddle supporting structure further comprises a pair of accessory hooks; and
    the pair of accessory hooks being connected onto the rear edge.

5. The portable saddle stand apparatus as claimed in claim 1 comprises:
    the saddle supporting structure further comprises an indentation;
    the indentation being adjacently positioned with the front edge;
    the indentation being extended from a left elongated section of the shell to a right elongated section of the shell; and
    the indentation being externally integrated onto the shell.

6. The portable saddle stand apparatus as claimed in claim 1 comprises:
    the front mount and the rear mount each comprise a body, a first circular channel, and a second circular channel;
    the first circular channel being concentrically positioned with the body;
    the first circular channel traversing through the body from a lateral surface of the body;
    the second circular channel being centrally positioned with a bottom surface of the body;
    the second circular channel traversing into the body from the bottom surface; and
    a diameter of the second circular channel being greater than a diameter of the first circular channel.

7. The portable saddle stand apparatus as claimed in claim 6, wherein a central axis of the saddle supporting structure being vertically aligned and oriented parallel with a central axis of the first circular channel and a central axis of the second circular channel.

8. The portable saddle stand apparatus as claimed in claim 1 comprises:
    the plurality of front strap holes comprises a pair of front left holes and a pair of front right holes;
    the pair of front left holes and the pair of front right holes being adjacently positioned with the front edge;
    the pair of front left holes traversing through a left elongated section of the shell;
    the pair of front right holes traversing through a right elongated section of the shell; and
    the front strap fastener being tethered within the pair of front left holes and the pair of front right holes.

9. The portable saddle stand apparatus as claimed in claim 1 comprises:

the plurality of rear strap holes comprises a pair of rear left holes and a pair of rear right holes;
the pair of rear left holes and the pair of rear right holes being adjacently positioned with the rear edge;
the pair of rear left holes traversing through a left elongated section of the shell;
the pair of rear right holes traversing through a right elongated section of the shell; and
the rear strap fastener being tethered within the pair of rear left holes and the pair of rear right holes.

10. A portable saddle stand apparatus comprises:
a saddle supporting structure;
a front mount;
a rear mount;
a front strap fastener;
a rear strap fastener;
the saddle supporting structure comprises a shell, a front mount receiving bracket, a rear mount receiving bracket, a plurality of front strap holes, and a plurality of rear strap holes;
the shell comprises a left elongated section and a right elongated section;
the left elongated section and the right elongated section being angularly positioned opposite of each other from the front edge to the rear edge;
the shell being delineated by the front edge, the rear edge, the left elongated section, and the right elongated section;
the front mount receiving bracket being positioned adjacent to a front edge of the shell;
the rear mount receiving bracket being positioned adjacent to a rear edge of the shell;
the front mount receiving bracket and rear mount receiving bracket being internally integrated onto the shell;
the front mount being attached within the front mount receiving bracket;
the rear mount being attached within the rear mount receiving bracket;
the front strap fastener being tethered around the saddle supporting structure and the front mount through the plurality of front strap holes; and
the rear strap fastener being tethered around the saddle supporting structure and the rear mount through the plurality of rear strap holes.

11. The portable saddle stand apparatus as claimed in claim 10 comprises:
the saddle supporting structure further comprises a first opening, a first storage compartment, a second opening, and a second storage compartment;
the first opening traversing through the left elongated section;
the first storage compartment being internally positioned with the left elongated section and aligned with the first opening;
the first storage compartment being integrated onto the front mount receiving bracket and the rear mount receiving bracket;
the second opening traversing through the right elongated section;
the second storage compartment being internally positioned with the right elongated section and aligned with the second opening;
the second storage compartment being integrated onto the front mount receiving bracket and the rear mount receiving bracket;
a handle being positioned within the shell; and
the handle being delineated from the first opening to the second opening.

12. The portable saddle stand apparatus as claimed in claim 10 comprises:
the saddle supporting structure further comprises a pair of accessory hooks; and
the pair of accessory hooks being integrated onto the rear edge.

13. The portable saddle stand apparatus as claimed in claim 10 comprises:
the saddle supporting structure further comprises an indentation;
the indentation being adjacently positioned with the front edge;
the indentation being extended from the left elongated section to the right elongated section; and
the indentation being externally integrated onto the shell.

14. The portable saddle stand apparatus as claimed in claim 10 comprises:
the front mount and the rear mount each comprise a body, a first circular channel, and a second circular channel;
the first circular channel being concentrically positioned with the body;
the first circular channel traversing through the body from a lateral surface of the body;
the second circular channel being centrally positioned with a bottom surface of the body;
the second circular channel traversing into the body from the bottom surface; and
a diameter of the second circular channel being greater than a diameter of the first circular channel.

15. The portable saddle stand apparatus as claimed in claim 14, wherein a central axis of the saddle supporting structure being vertically aligned and oriented parallel with a central axis of the first circular channel and a central axis of the second circular channel.

16. The portable saddle stand apparatus as claimed in claim 10 comprises:
the plurality of front strap holes comprises a pair of front left holes and a pair of front right holes;
the pair of front left holes and the pair of front right holes being adjacently positioned with the front edge;
the pair of front left holes traversing through the left elongated section;
the pair of front right holes traversing through the right elongated section; and
the front strap fastener being tethered within the pair of front left holes and the pair of front right holes.

17. The portable saddle stand apparatus as claimed in claim 10 comprises:
the plurality of rear strap holes comprises a pair of rear left holes and a pair of rear right holes;
the pair of rear left holes and the pair of rear right holes being adjacently positioned with the rear edge;
the pair of rear left holes traversing through the left elongated section shell;
the pair of rear right holes traversing through the right elongated section; and
the rear strap fastener being tethered within the pair of rear left holes and the pair of rear right holes.

* * * * *